(12) United States Patent
Shei

(10) Patent No.: US 8,499,683 B2
(45) Date of Patent: Aug. 6, 2013

(54) HOT AND COLD FOOD HOLDING APPLIANCE

(76) Inventor: Steven Michael Shei, Fort Wayne, IN (US)

( * ) Notice: Subject to any disclaimer, the term of this patent is extended or adjusted under 35 U.S.C. 154(b) by 993 days.

(21) Appl. No.: 12/538,133

(22) Filed: Aug. 8, 2009

(65) Prior Publication Data

US 2011/0030565 A1 Feb. 10, 2011

(51) Int. Cl.
| | |
|---|---|
| A47J 37/08 | (2006.01) |
| A47J 36/00 | (2006.01) |
| A21B 1/22 | (2006.01) |
| A21B 1/26 | (2006.01) |
| F25B 29/00 | (2006.01) |

(52) U.S. Cl.
USPC ............... 99/329 P; 99/324; 99/330; 99/331; 99/349; 99/374; 99/448; 99/468; 62/256; 62/258; 62/92; 165/244; 165/253

(58) Field of Classification Search
CPC ..... A21B 1/22; A21B 1/26; A47J 36/00; F25B 29/00
USPC ............... 99/324, 329 P, 330, 331, 349, 374, 99/448, 468; 62/256, 258, 92; 426/438, 426/496, 523; 219/202, 385, 391, 395, 399, 219/401, 413, 482, 490, 491; 126/33, 41 C; 165/244, 253
See application file for complete search history.

(56) References Cited

U.S. PATENT DOCUMENTS

| | | | | |
|---|---|---|---|---|
| 4,250,955 A | * | 2/1981 | Plattner et al. | 165/244 |
| 4,274,391 A | * | 6/1981 | Karapetian | 126/33 |
| 5,188,020 A | * | 2/1993 | Buchnag | 99/468 |
| 5,235,903 A | * | 8/1993 | Tippmann | 99/331 |
| 5,282,367 A | * | 2/1994 | Moore et al. | 62/256 |
| 5,947,012 A | * | 9/1999 | Ewald et al. | 99/374 |
| 6,541,739 B2 | * | 4/2003 | Shei et al. | 219/399 |
| 6,602,533 B1 | * | 8/2003 | Smith et al. | 426/438 |
| 6,658,994 B1 | * | 12/2003 | McMillan | 99/468 |
| 6,670,585 B2 | * | 12/2003 | Burkett et al. | 219/491 |
| 6,710,308 B2 | * | 3/2004 | Sauter et al. | 219/490 |
| 6,722,150 B1 | * | 4/2004 | Carr et al. | 62/258 |
| 6,841,760 B2 | * | 1/2005 | Whipple, Jr. | 219/395 |
| 7,081,601 B2 | * | 7/2006 | Boyer et al. | 219/482 |
| 7,317,173 B2 | * | 1/2008 | Bartelick et al. | 219/401 |
| 7,325,483 B2 | * | 2/2008 | Szymanski | 99/349 |
| RE40,290 E | * | 5/2008 | Shei et al. | 219/399 |
| 7,446,282 B2 | * | 11/2008 | Shei et al. | 219/391 |
| 7,874,286 B2 | * | 1/2011 | Sands et al. | 126/41 C |
| 2004/0020915 A1 | * | 2/2004 | Shei | 219/385 |
| 2004/0069155 A1 | * | 4/2004 | Shei | 99/448 |
| 2006/0237182 A1 | * | 10/2006 | Godecker et al. | 165/253 |

(Continued)

Primary Examiner — Henry Yuen
Assistant Examiner — Brett Spurlock
(74) Attorney, Agent, or Firm — Taylor IP, P.C.

(57) ABSTRACT

A hot and cold food holding appliance including (1) Positioning a heat transfer plate above the top of food holding pans forming the top surface of each food holding compartment. (2) Providing a heat transfer module to transfer energy to/from the food holding pans in each compartment. (3) Thermally isolating each heat transfer module from an adjacent heat transfer module. (4) Removable heat transfer partitions that can used to subdivide each food holding compartment into sections providing additional heat transfer capability along the sides of each food holding pan and blocking the flow of ambient air between the food holding pans. (5) A control system that regulates the temperature of each food holding compartment by sensing the temperature of each heat transfer module and adjusting the amount of heat energy to be transferred.

15 Claims, 12 Drawing Sheets

U.S. PATENT DOCUMENTS

| | | | |
|---|---|---|---|
| 2007/0227364 A1* | 10/2007 | Andoh et al. | 99/324 |
| 2008/0023459 A1* | 1/2008 | Leach | 219/202 |
| 2008/0092749 A1* | 4/2008 | Kim | 99/329 P |
| 2008/0171120 A1* | 7/2008 | Willett | 426/496 |
| 2008/0202350 A1* | 8/2008 | Maki | 99/330 |
| 2008/0289514 A1* | 11/2008 | Speranza | 99/468 |

* cited by examiner

HOT AND COLD FOOD HOLDING APPLIANCE

FIELD OF THE INVENTION

The present invention relates to food holding appliances and, more particularly, to hot and cold food holding equipment used in the restaurant and food preparation industry.

BACKGROUND OF THE INVENTION

Restaurants and food service providers must have quick access to both hot and cold foods to assemble sandwiches and meals for delivery to customers. Food is likely to be prepared in batches and stored in a food holding appliance near the point of assembly. The food must be held in a food safe environment that inhibits the growth of bacteria and also preserves the quality of the food throughout the holding time. It is important that all food components of a meal be close to the point of assembly to increase the efficiency and speed of the preparation staff. As food service restaurants increase their menu offerings the number of unique food components increases, creating demand for more flexible hot and cold food holding capacity that can be configured to give each food product a unique thermal treatment. There is a need for a flexible food holing appliance that can hold both hot and cold foods without requiring too much counter top space in the preparation area. Counter top space is highly valued in commercial restaurants and it is important to have the flexibility to hold both hot and cold food products as close to the point of use as possible. This requires the use of the vertical space above the counter top which is usually not utilized as efficiently as possible. The ability to utilize the vertical space efficiently requires a combination of hot and cold food storage that is not available in existing food holding appliances. The flexibility to change a food holding space from hot to cold will further enhance the efficiency and utility of a food holding appliance allowing the food service provider to change their menu offerings quickly using one food holding appliance instead of several different appliances.

Food holding appliances in use today usually arrange food pans in an array distributed across a planar surface. Hot food holding is accomplished by filling a rectangular container with hot water and suspending the food pans over the hot water, U.S. Pat. No. 4,274,391 shows this design. Cold food holding is very similar with food holding pans suspended over a rectangular box or channel that is wrapped with refrigeration coils or with forced cold air around the bottom, sides, and over the top surface of the food pans, U.S. Pat. Nos. 6,722,150 and 5,282,367. The top surface of the food pans are arranged in an array distributed over a flat surface with the top of the food pan parallel or slightly below the top surface. These food holing appliances require considerable counter top space with food holding pans arranged in horizontal rows distributed in an array across the surface. Both of these food holding appliances are typically used in salad bars and hot food serving lines for food buffet arrangements. They are also commonly used in the food preparation kitchen for holding hot and cold food prior to assembly of meals.

Hot and cold food holding cabinets circulate air around the pans and over the surface of the food. U.S. Pat. Nos. 4,250,955 and 6,670,585 illustrate this type of appliance. The food pans are contained within an enclosed cabinet and a means to control the humidity and temperature of the air may be provided. Access to the food is provided by a door that is opened and closed. Some types of holding cabinets can be changed from hot to cold within the same appliance by circulating hot or cold air through the cabinet. All of the food pans contained within the cabinet share the same circulated hot or cold air. Multiple food pans are supported by shelves built in to the interior of the cabinet.

There are other hot food holding appliances that arrange the food holding pans in an array of compartments that can be vertically and horizontally distributed. U.S. Pat. Nos. 5,947,012 and 6,541,739 illustrate this type of holding appliance. These units typically eliminate the use of water for humidification, using conductive or radiant heat to keep the food at an acceptable holding temperature. In some units the temperature of each hot holding compartment can be individually controlled. In some units the compartment is sized to fit the food pan, while others use a large rectangular compartment that can hold one or more food pans with radiant heat supplied from the top and bottom surfaces.

Hot and cold food holding appliances that arrange the food pans in an array along a planar surface suffer from many limitations. They use a large amount of valuable counter top space, making it difficult to hold multiple food products close to the point of assembly causing the food preparation worker to move from the assembly station to another location to access each food item. This is an inefficient use of labor that would not be necessary if multiple food products were held in a vertical array in front of the point of assembly. Workers often remove empty pans from steam heated holding units allowing the release of steam vapor which wastes energy. The water must be replaced and heated each day before food pans can be placed in to the holding unit and emptied every night to sanitized the equipment of bacteria laden food particles that have accumulated. The refrigerated units extract heat energy from the food pans by encircling them with cold walls or forcing cold air around the food pan bottom, sides, and top. It is very difficult to maintain consistent temperatures and quality. Cold air is dry and humidity can not be added because it will cause a disabling build up of frost on the evaporator coils. Dry, cold air will dry out food products and degrade the quality. Both hot and cold holding units rely on the operator to replace the food pan cover after dispensing food to keep the food quality and temperature in the range of acceptability since the exposed top surface will be affected by the restaurant kitchen environment. Due to the difficulties listed above, it is very difficult to hold hot and cold food products close to the point of assembly while maintaining acceptable quality.

Food holding cabinets are able to vertically integrate food holding space but suffer from a number of problems that make them inefficient and difficult to use. The food holding compartment that forms the interior of the cabinet gives each pan in the compartment the same thermal treatment by circulating hot, humidified, or cold dry air throughout the compartment. The temperature is not even, causing hot or cold spots. Every time the cabinet door is opened, the entire conditioned air content of the cabinet must be re-generated. This is a waste of energy when the cabinet contents must be repeatedly accessed to assemble food items for serving. All of the foods will share the same air within the cabinet so the transfer of flavor from one food item to another can only be stopped by adding a cover to each food pan. This cover must be removed and replaced each time the food pan is accessed for serving. Since the cabinet environment gives all of the food pans the same thermal treatment, separate cabinet compartments must be used for hot and cold food products. Holding cabinets require expensive fans, motors, and humidity generation systems to function making them expensive to purchase, maintain, and repair.

Food holding appliances that arrange food holding pans in an array of compartments eliminate some of the problems listed above but can not be used to hold a combination of hot and cold foods in one appliance. Cold food must be held in one of the other food holding units described above.

SUMMARY OF THE INVENTION

In accordance with the present invention a novel apparatus is disclosed that provides both hot and cold holding for food products in one food holding appliance. In preferred embodiments the improvements include one or more of the following:

(1) Positioning a heat transfer module containing a heat transfer plate above the top of one or more food holding pans forming the top surface of each food holding compartment.

(2) Providing a heat transfer module to transfer both cold or hot heat energy to the food holding pans in each compartment.

(3) Thermally isolating each heat transfer module form an adjacent heat transfer module to provide independent temperature control of hot or cold food holding compartments in one food holding appliance.

(4) Removable heat transfer partitions that can used to subdivide each food holding compartment in to sections providing additional heat transfer capability along the sides of each food holding pan and blocking the flow of ambient air between the food holding pans.

(5) A control system that regulates the temperature of each hot or cold food holding compartments by sensing the temperature of each heat transfer module and adjusting the amount of heat energy to be added or removed.

It is therefore an object of the invention to provide a food holding appliance that will hold both hot and cold foods in one appliance in thermally isolated compartments that have independent control of the food holding temperature.

It is another object of the invention to make efficient use of counter top space by providing one or more food holding compartments arranged in a vertical array minimizing the need for counter top space.

It is another object of the invention to provide food holding compartments that can be subdivided with heat transfer partitions that block ambient air flow and improve heat transfer along the sides of each food holding pan.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
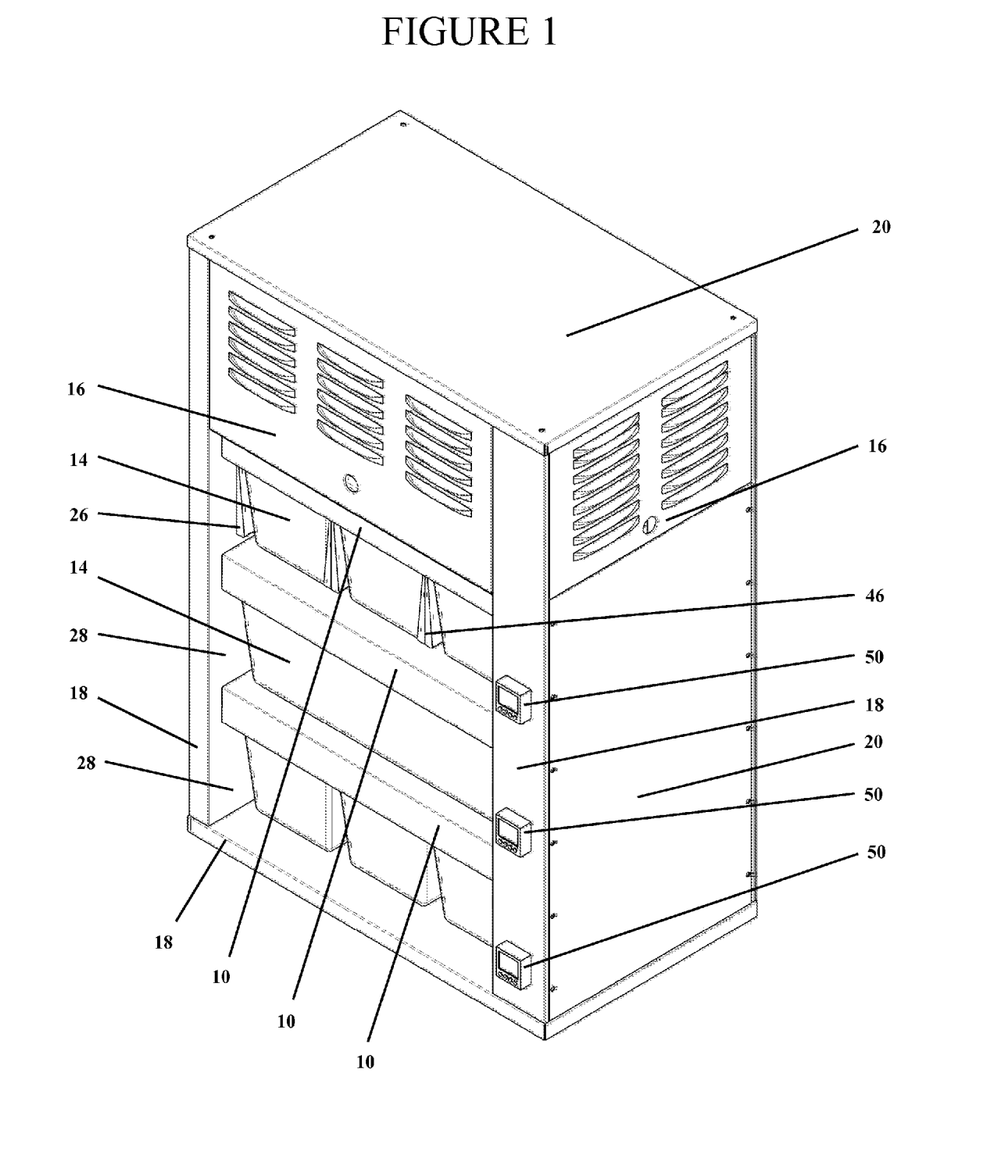
FIG. 1 is a front perspective view of a food holding appliance.

FIG. 1 is a front perspective view of a food holding appliance shown in which a food holding pan 14 is removably arranged in a food holding compartment 28.

Figure 2:
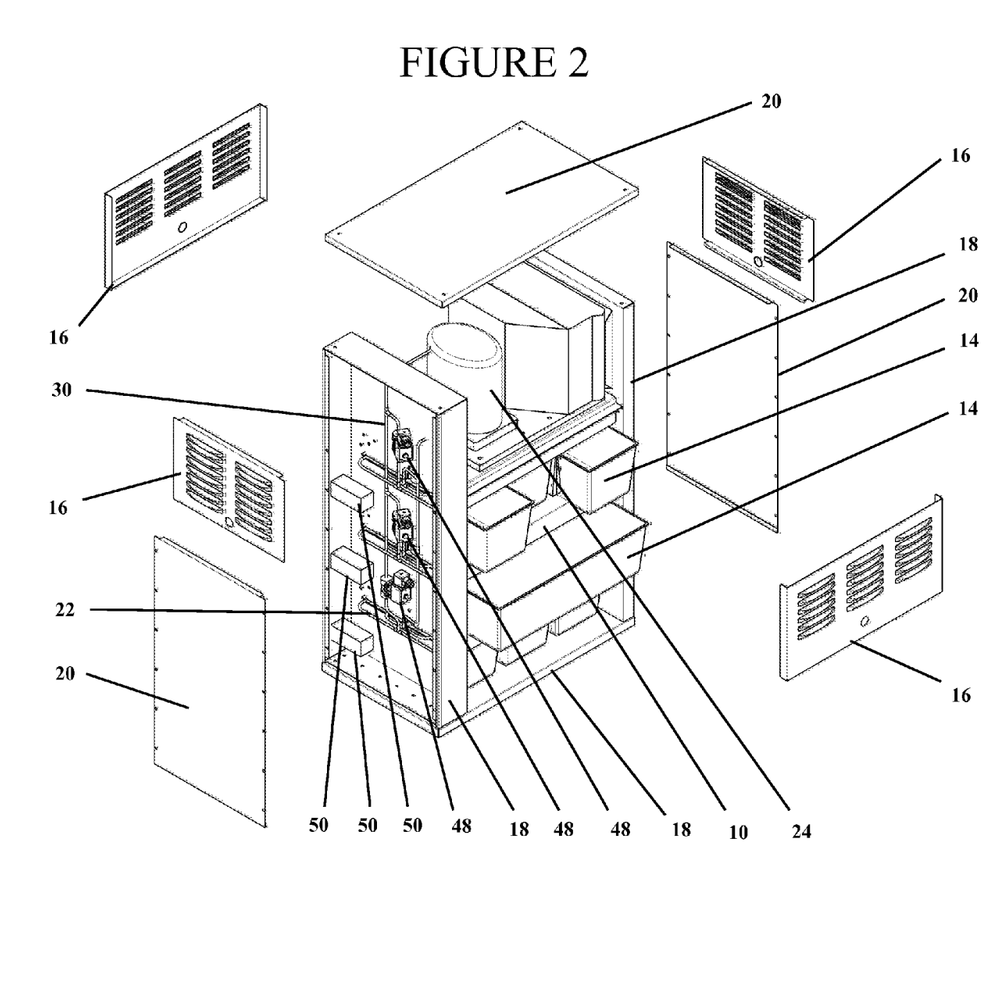
FIG. 2 is a front perspective exploded view of a food holding appliance.

FIG. 2 is an exploded perspective view of a food holding appliance with the refrigeration compressor 24, heat transfer fluid passage manifold 22, heat transfer fluid passage 30, and fluid control valve 48 exposed.

Figure 3:
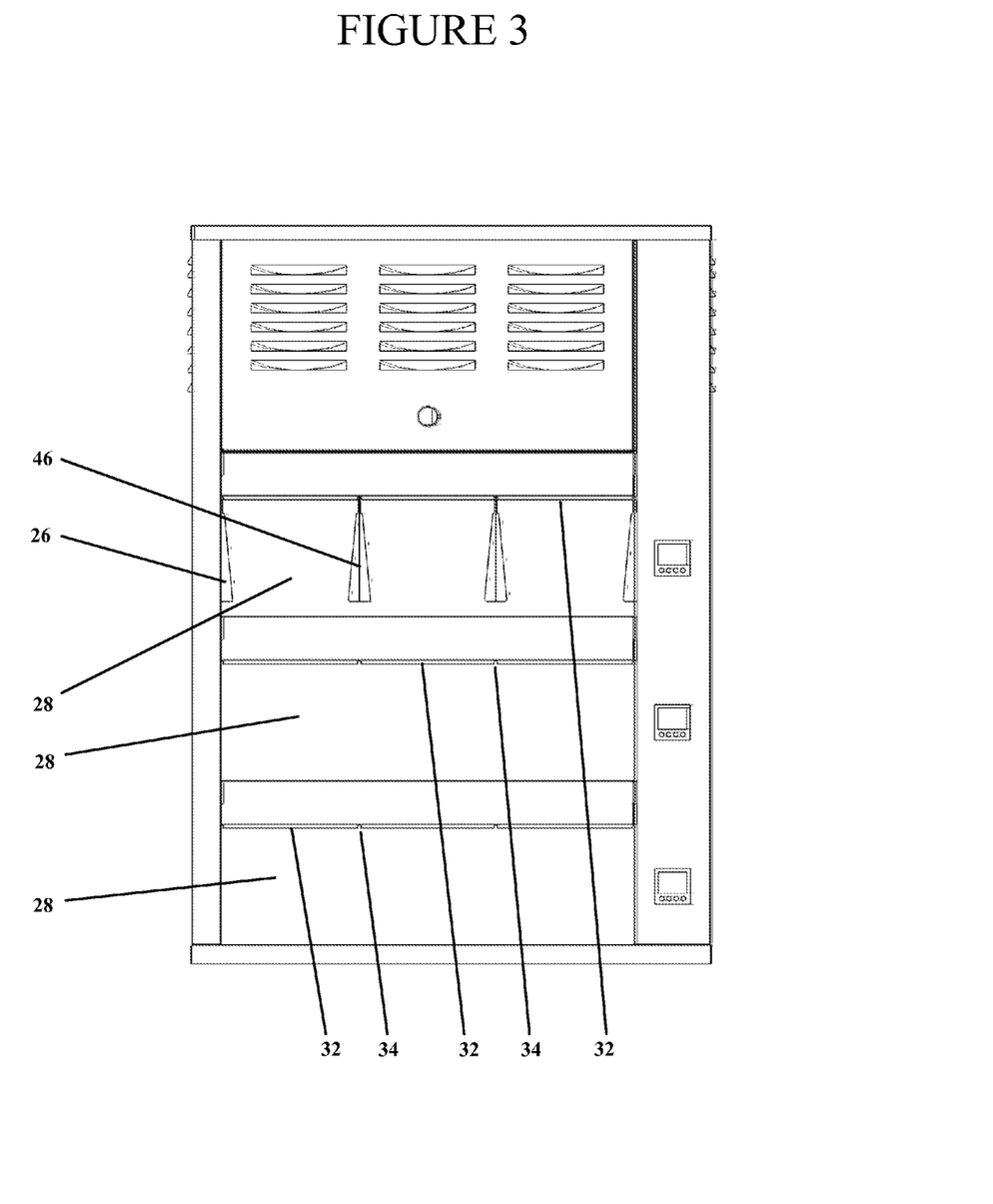
FIG. 3 is a front elevation view of a food holding appliance.

FIG. 3 is a front elevation view of a food holding appliance with the food holding pan 14 removed to expose the food holding compartment 28, removable heat transfer partition assembly 46, removable heat transfer partition 26, and heat transfer partition guide 34.

Figure 4:
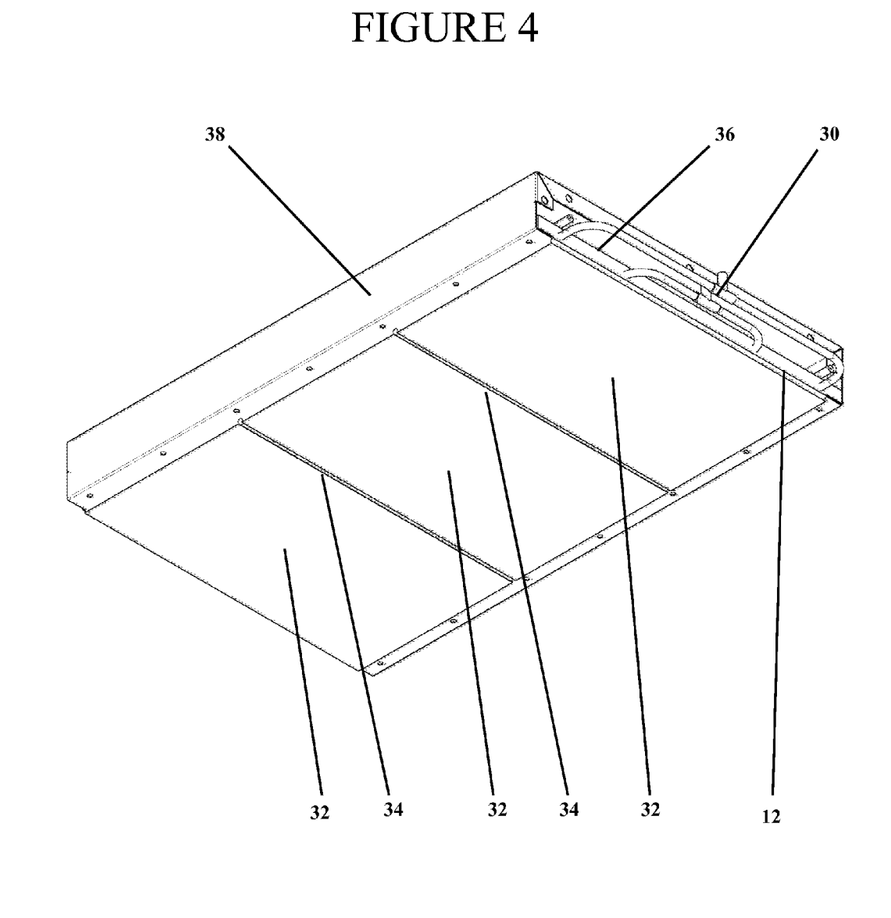
FIG. 4 is a perspective view of a heat transfer module.

FIG. 4 is a perspective view of a heat transfer module 10.

Figure 5:
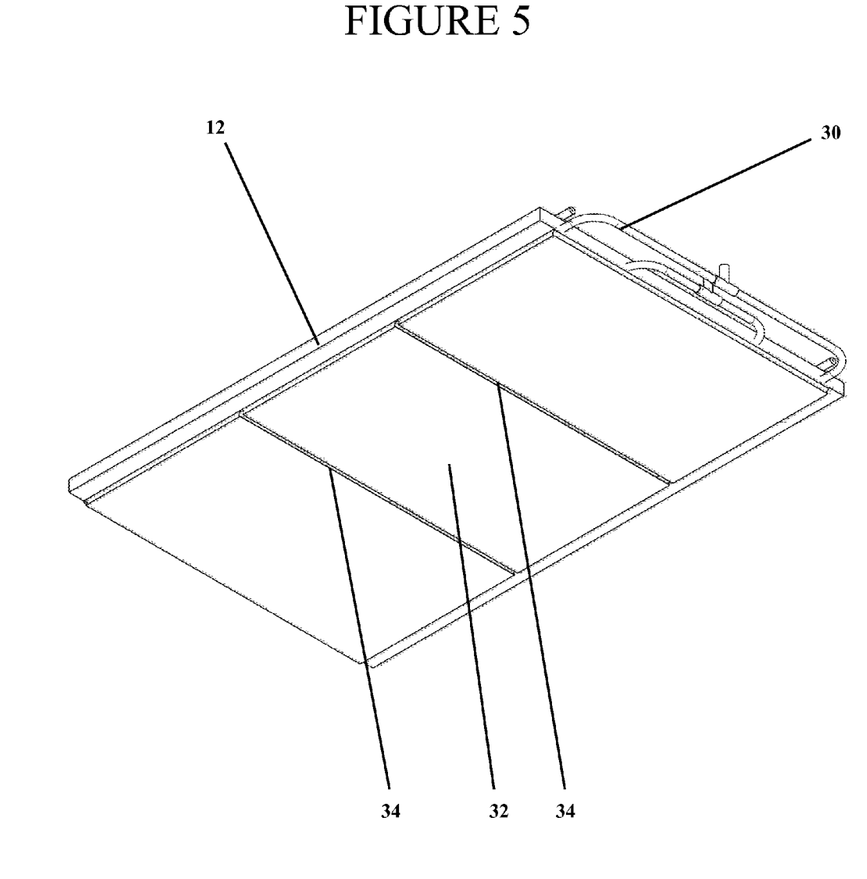
FIG. 5 is a perspective view of a heat transfer plate casting with internal fluid passage tubes.

FIG. 5 is a perspective view of a heat transfer plate 12 with internal heat transfer fluid passage 30 tubes.

Figure 6:
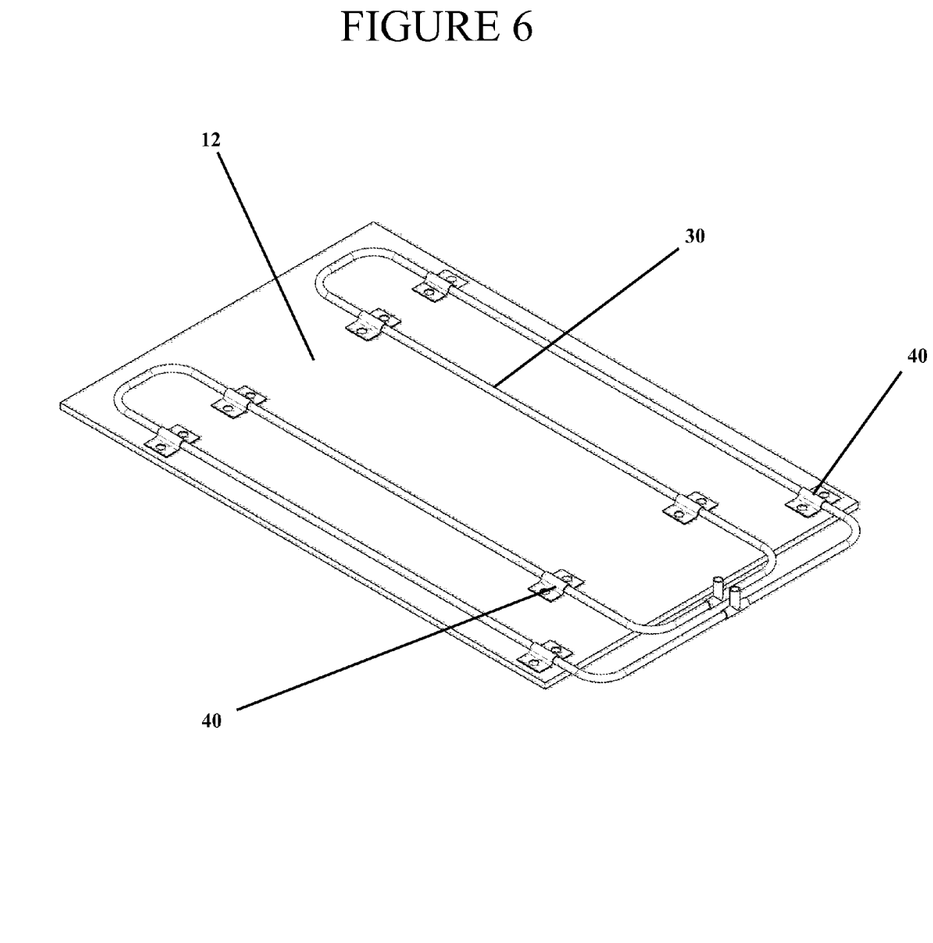
FIG. 6 is a perspective view of a heat transfer plate with fluid passage tubes fastened to the surface.

FIG. 6 is a perspective view of a heat transfer plate 12 with heat transfer fluid passage 30 tubes fastened to the surface.

Figure 7:
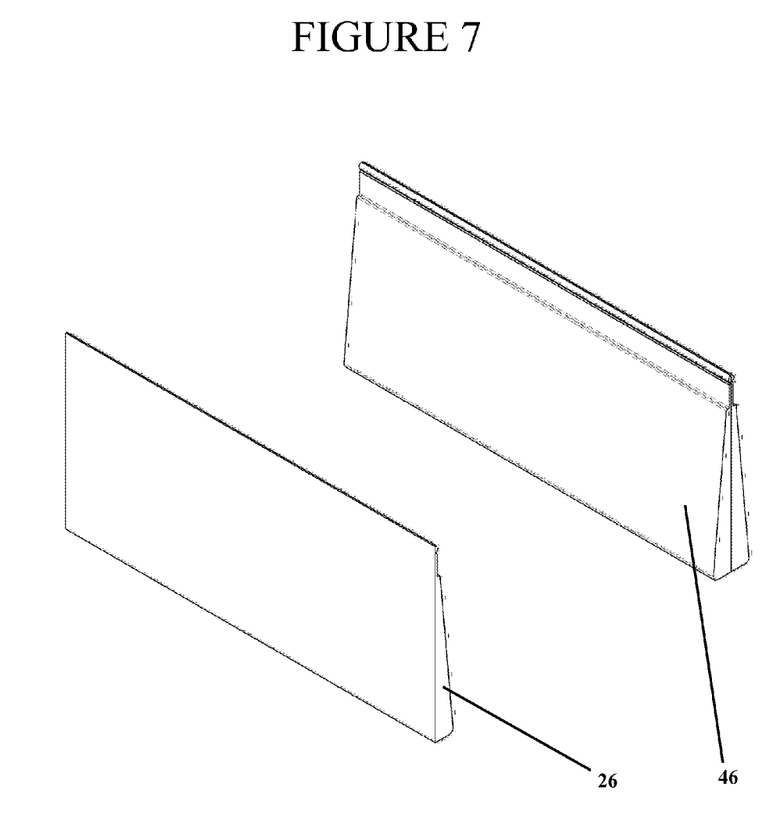
FIG. 7 is a perspective view of a removable heat transfer partition and removable heat transfer partition assembly.

FIG. 7 is a perspective view of a removable heat transfer partition 26 and a removable heat transfer partition assembly 46.

Figure 8:
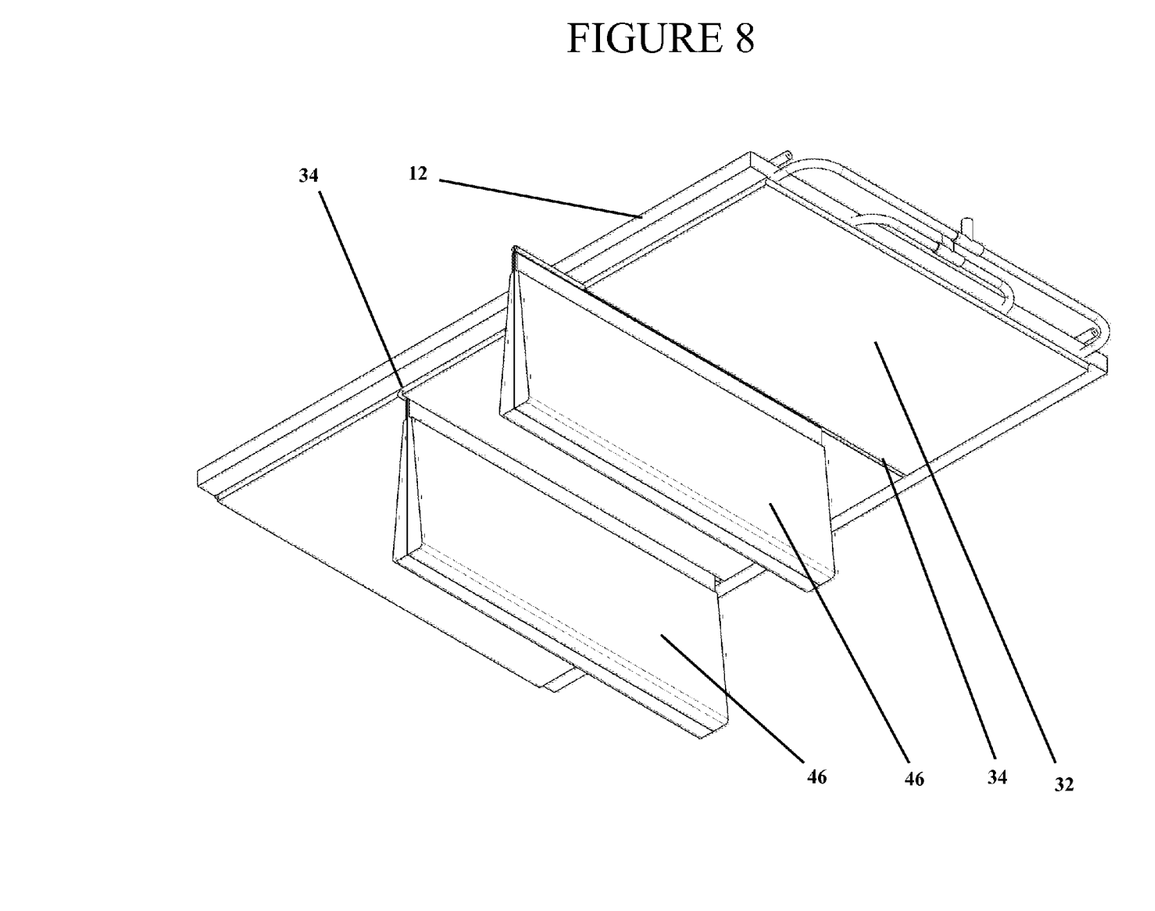
FIG. 8 is a partial perspective view of an assembly of removable heat transfer partitions and heat transfer partition guide slots.

FIG. 8 is a partial perspective view of a removable heat transfer partition assembly 46 and heat transfer partition guide 34 slot.

Figure 9:
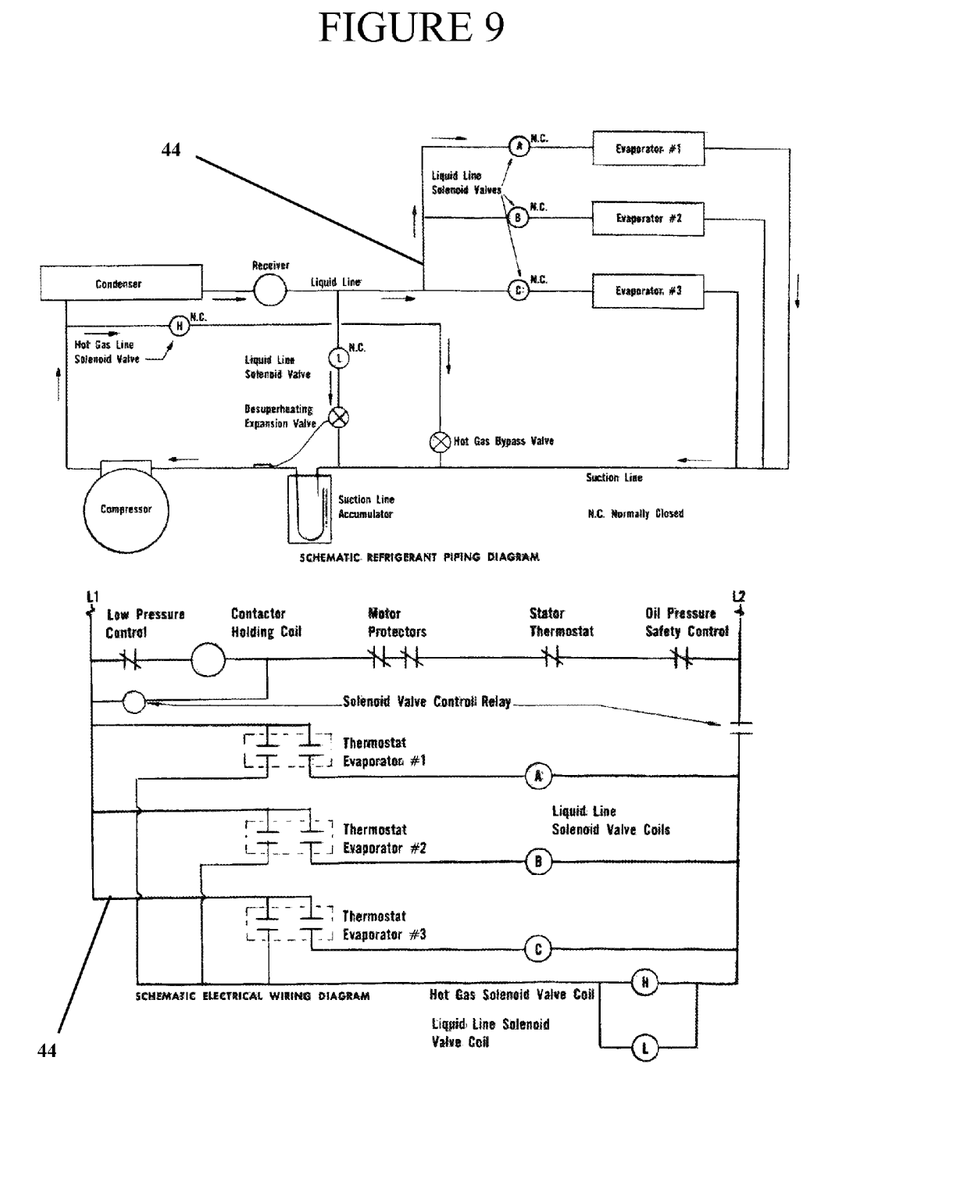
FIG. 9 is a control schematic view of a multiple evaporator refrigeration control system.

FIG. 9 is a control schematic view of the multiple evaporator refrigeration control system 44.

Figure 10:
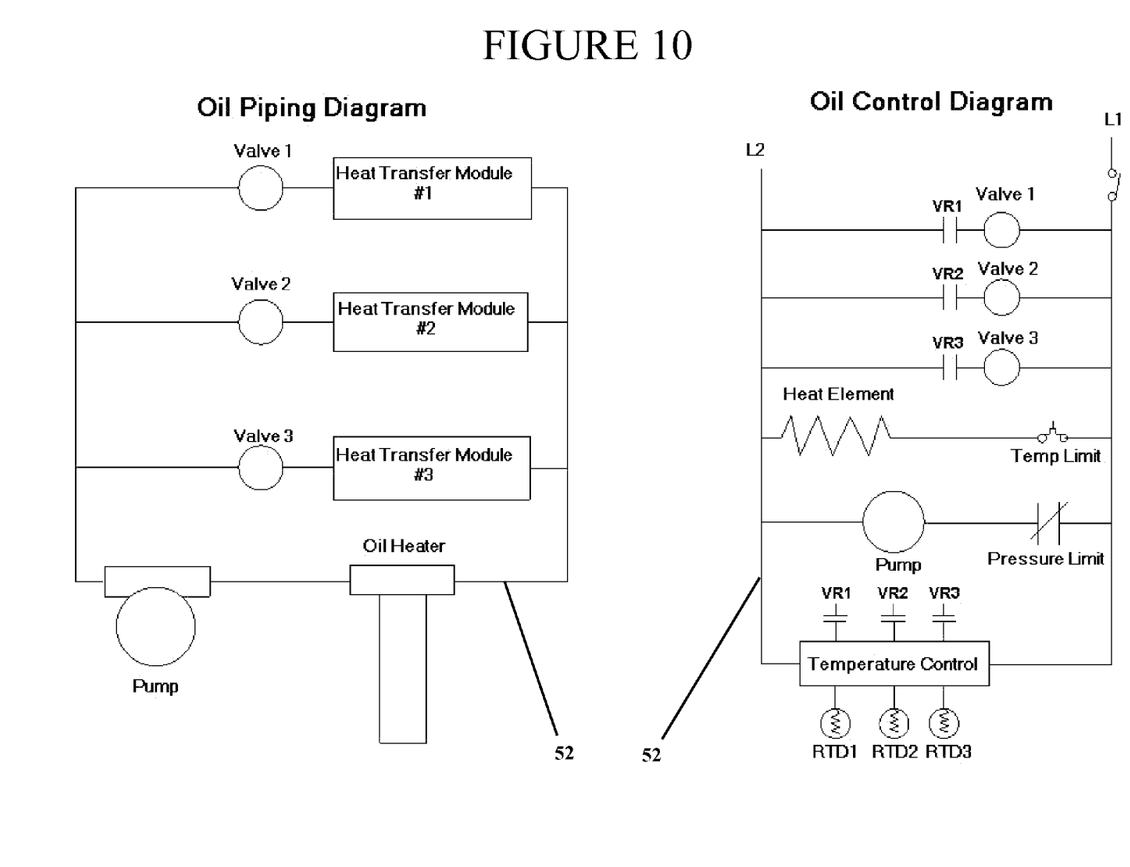
FIG. 10 is a control schematic view of an oil heat control system.

FIG. 10 is a control schematic view of the oil heat control system 52.

Figure 11:
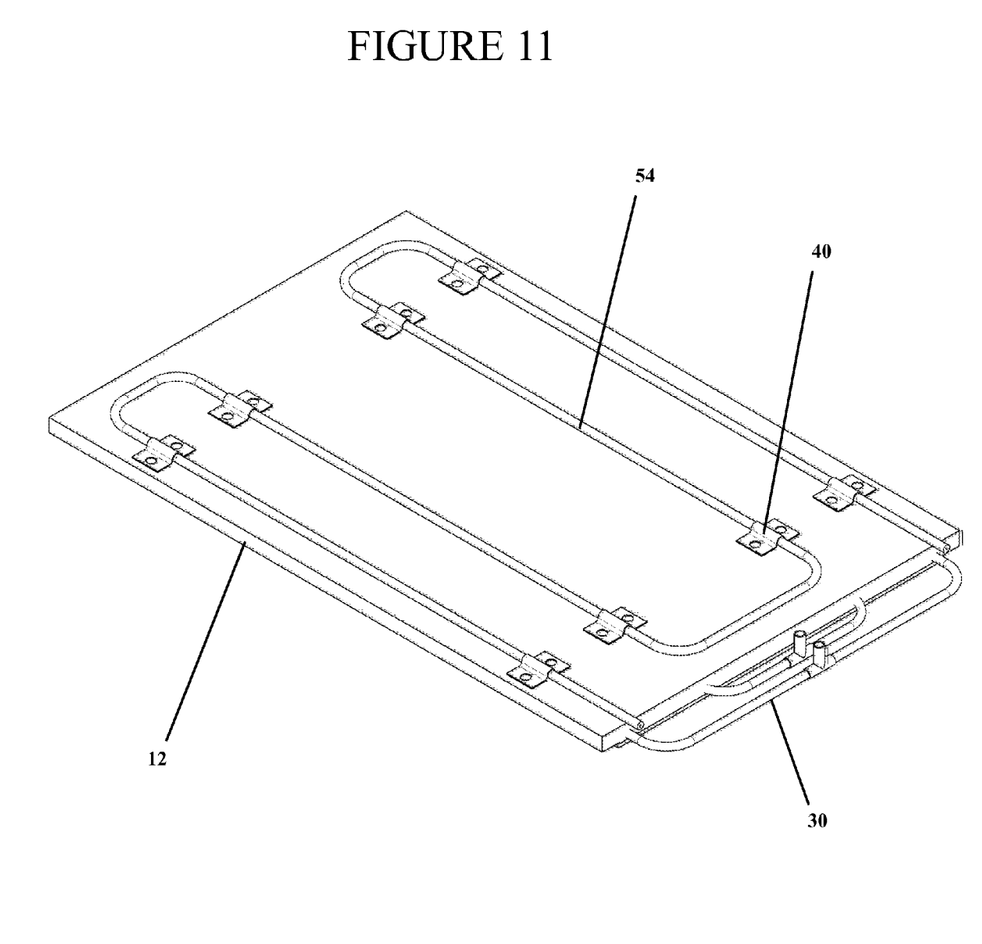
FIG. 11 is a perspective view of a heat transfer plate with heat transfer fluid passage and heat element.

FIG. 11 is a perspective view of a heat transfer plate 12 with a heat transfer fluid passage 30 and heat element 54 combined in to one assembly.

Figure 12:
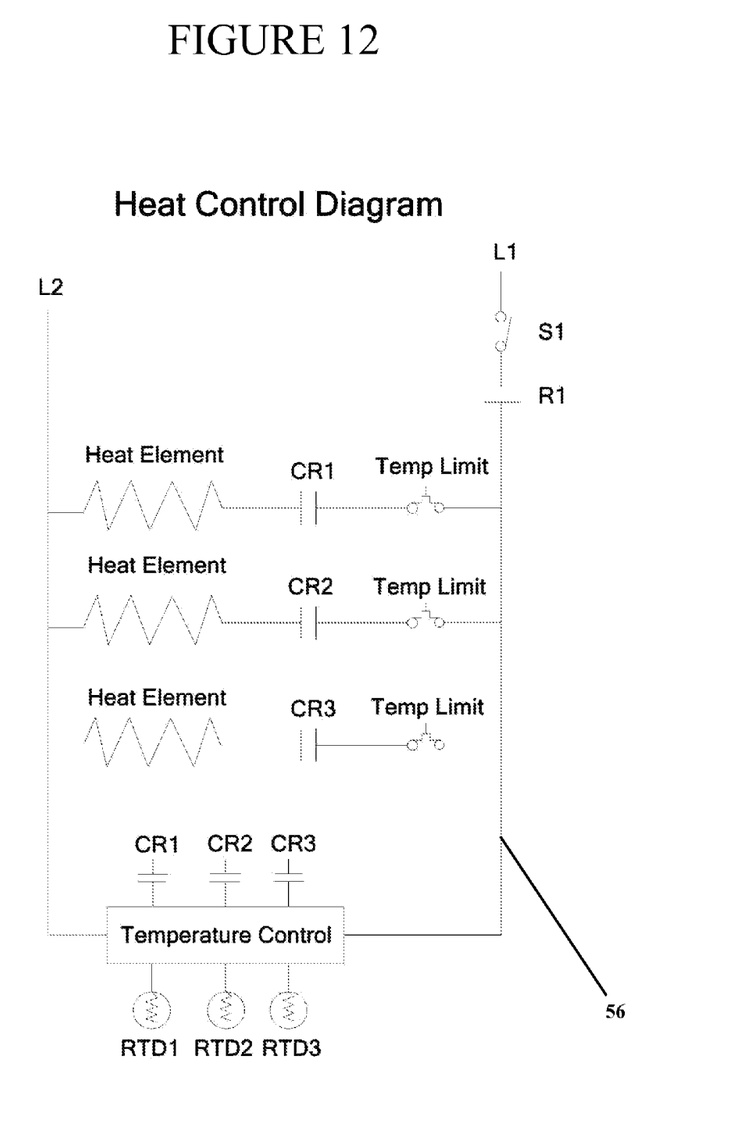
FIG. 12 is a control schematic view of an electric heat control circuit.

FIG. 12 is a control schematic view of an electric heat control system 56.

In Operation

Two different food holding pan 14 sizes are shown to illustrate the flexibility of placement and size of the food holding pan 14 in the food holding compartment 28. The upper and lower horizontal boundary of the food holding compartment 28 is defined by the location of the heat transfer module 10 and the vertical boundary of the food holding compartment 28 is defined by the support structure 18. Each food holding compartment 28 can be further divided by a removable heat transfer partition 26 and a removable heat transfer partition assembly 46 in any quantity necessary to accommodate one or more food holding pan 14. It is understood that the food holding compartment 28 can be sized to hold a food holding pan 14 of any height, width, depth, or quantity by adapting the geometry and quantity of the heat transfer module 10, support structure 18, removable heat transfer partition 26, and removable heat transfer partition assembly 46 to receive a food holding pan 14 of different capacity. Multiple food holding compartment 28 are defined by vertically arranging multiple heat transfer module 10 within the support structure 18. An access panel with air flow passages 16 and solid access panel 20 are fastened or removably supported on the support structure 18 to limit access to the electrical and mechanical components while providing suitable air flow for the heat transfer processes. The support structure 18, access panel with air flow passages 16, and access panel 20 are made from a suitable corrosion resistant metal but other materials not limited to plastic or painted metal would be suitable for this purpose. The food holding pan 14 will usually be metal or plastic from a commercially available source such as Cambro Manufacturing Company part #16CW and #36CW as shown in FIG. 1. The food holding pan 14 can be made from any material suitable for the purpose of storage, containing, transporting, and holding food products. A temperature control 50 is shown mounted in the support structure 18. One temperature control 50 is assigned and mounted in close proximity to each food holding compartment 28. The temperature control 50 allows each food holding compartment 28 to be set for a different temperature. The operator will insert a food holding pan 14 in to the food holding compartment 28 and select the holding temperature by activating the temperature control 50 that is associated with the food holding compartment 28. Multiple food holding compartment 28 can be arranged in each food holding appliance allowing the operator to hold the food in each food holding compartment 28 at a different temperature. One food holding compartment 28 can be controlled to keep food refrigerated from 32 to 41 degrees Fahrenheit while the adjacent food holding compartment 28 can be controlled to keep food hot from 145 to 212 degrees Fahrenheit. Another food holding compartment 28 can be controlled to keep food frozen at −10 to 31 degrees Fahrenheit.

The refrigeration compressor 24 and condenser assembly is shown mounted to the support structure 18. The refrigeration compressor 24 and condenser is enclosed on the top by an access panel 20 and on the sides by one or more access panel with air flow passages 16 that direct the flow of air through the condenser compartment formed by these panels. The access panel with air flow passages 16 is removable to allow adjustment of the refrigeration control system 44. The size and number of air flow passages in each access panel with air flow passages 16 can be adjusted to match the air flow requirements of the refrigeration compressor 24 and condenser. The refrigeration compressor 24 is sized to adequately transfer the correct amount of heat from each heat transfer module 10. The heat transfer rate for each heat transfer module 10 is calculated by consideration of the food product heat load, desired food holding temperature range, expected heat loss to the environment, and the average environment ambient temperature. The heat transfer fluid passage 30, heat transfer fluid passage manifold 22, and fluid control valve 48 distribute the heat transfer fluid to each heat transfer module 10. The fluid control valve 48 receives a signal from the refrigeration control system 44 and temperature control 50 to change state from closed to open, allowing heat transfer fluid to flow, or open to closed, blocking the flow of heat transfer fluid. This regulates the temperature of the heat transfer module 10 and the amount of heat energy exchanged with the food holding pan 14.

The food holding compartment 28 can be divided in to smaller compartments by the addition of a removable heat transfer partition assembly 46 or removable heat transfer partition 26 by sliding them in to the heat transfer partition guide 34. The food holding compartment 28 can be accessed for insertion or removal of a food holding pan 14 from both sides of the food holding appliance giving the operator flexibility in the management of the food holding pan 14. The engagement of the removable heat transfer partition assembly 46 and removable heat transfer partition 26 through the heat transfer partition guide 34 produces heat conduction from the heat transfer surface 32 to these components providing additional heat transfer capacity to the sides of the food holding pan 14. These components are made from aluminum but any heat conductive material could be used. The removable heat transfer partition assembly 46, and removable heat transfer partition 26 could be made from an insulating material to reduce heat transfer to the food holding pan 14 sides. These components also serve to block the flow of convection air between one food holding pan 14 and another.

One or more heat transfer modules can be combined with the support structure 18 to define one or more food holding compartments. The heat transfer module 10 contains at least one heat transfer plate 12 that has a heat transfer fluid passage 30 for the circulation of hot or cold heat transfer fluid. The heat transfer fluid passage 30 guides the heat transfer fluid through the heat transfer plate 12 causing a difference in temperature between the heat transfer surface 32 and the food holding compartment 28 and food holding pan 14. The heat transfer fluid passage 30 guides heat transfer fluid through the heat transfer plate 12 and provides a discharge back to the device that either cools or heats the heat transfer fluid. The heat transfer fluid passage 30 can be located in the heat transfer plate 12 to guide the cold or hot heat transfer fluid through the heat transfer plate 12 in a manner that produces uniform temperature across the heat transfer plate 12 and heat transfer surface 32 or guided in a manner to produce unequal temperatures across the heat transfer surface 32 to compensate for heat energy loss from the ends of the food holding compartment 28 and food holding pan 14 that are exposed to the ambient room temperature. The heat transfer plate 12 is made out of aluminum but any material with heat conductive properties could be used. The bottom surface of the heat transfer plate 12 provides a heat transfer surface 32 that is exposed to the food holding compartment 28 and food holding pan 14. The heat transfer module housing 38 provides structural support and a means for locating the heat transfer plate 12 and an insulation space 36 for limiting heat transfer to adjacent heat transfer modules. The insulation space 36 could be from 0 inches to 3 inches which is determined by the amount of heat transfer allowed from the heat transfer module 10 to an adjacent heat transfer module 10 and the thermal resistance of the insulating material chosen. The top surface of the heat transfer module 10 provides a support surface for the bottom of a food holding pan 14 if there is an adjacent heat transfer module 10 located above it. The heat transfer module housing 38 is made from a corrosion resistant metal but could be made from any other material such as plastic suitable for the application. One or more heat transfer partition guide 34 slots are provided on the heat transfer surface 32 for the addition or removal of removable heat transfer partition assembly 46 units or removable heat transfer partition 26 units.

The heat transfer fluid passage 30 is cast in to the heat transfer plate 12 to provide intimate contact between the heat transfer fluid passage 30 and the heat transfer plate 12 providing efficient heat transfer to the heat transfer surface 32. The heat transfer fluid passage 30 is shown with an inlet for hot or cold heat transfer fluid and a discharge outlet to direct the heat transfer fluid back to the refrigeration compressor 24 for cold heat transfer fluids or heat source for hot heat transfer fluids. One or more heat transfer partition guide 34 slots are cast in to or milled on the heat transfer surface 32 for the addition or removal of removable heat transfer partition assembly 46 units or removable heat transfer partition 26 units. The heat transfer fluid passage 30 is made from copper tube but could be any other material that has heat conductive, temperature, and pressure properties suitable for the application.

The heat transfer fluid passage 30 can be mounted to the surface of the heat transfer plate 12 with multiple mounting bracket 40 units that are mechanically fastened in place by screws or other fastening means. The mounting bracket 40 forces intimate contact between the heat transfer plate 12 and the heat transfer fluid passage 30. The efficiency of this contact can be further enhanced by the application of heat conductive paste along the point of contact between the heat transfer fluid passage 30 and the heat transfer plate 12. The heat transfer fluid passage 30 can be removed and replaced by another heat transfer fluid passage 30 with a different geometric lay out that directs the heat transfer fluid to selected regions of the heat transfer plate 12. The arrangement shown in FIG. 6 directs the incoming heat transfer fluid to the outer edges of the heat transfer plate 12 first, providing greater heat transfer to the outer edges than the interior of the heat transfer plate 12. It is understood that this geometric configuration of the heat transfer fluid passage 30 can be changed to direct the incoming heat transfer fluid to any region of the heat transfer plate 12 and the discharge fluid will be a different temperature than the incoming fluid. A single heat transfer fluid passage 30 is shown in FIG. 6 but it is understood that multiple heat transfer fluid passage 30 units can be fastened to the heat transfer plate 12 to either equalize the heat transfer surface 32 temperature or direct more heat transfer fluid to one region as opposed to another to compensate for the heat transfer load of the food holding pan 14 or heat transfer to the environment through the exposed ends of the food holding pans.

The geometry of each partition is shaped to follow the contour of a food holding pan 14. This shape can be adjusted to increase or decrease the heat transfer rate to the food holding pan 14 or block the flow of convective heat transfer caused by air flowing between the food holding pan 14. The partitions have a key like feature at the top that allow them to be inserted in to the heat transfer partition guide 34 slot when needed. A combination of two removable heat transfer partition 26 units can be welded together to form one removable heat transfer partition assembly 46. The removable heat transfer partition 26 and removable heat transfer partition assembly 46 are made from aluminum but could be made from any material with good or poor heat conductive properties depending on the rate of heat transfer desired through the partitions.

The partitions are shown fully and partially engaged in the heat transfer partition guide 34 slots to illustrate that the partitions are removable and can be inserted as required to divide the food holding compartment 28 in to smaller compartments. The top of each removable heat transfer partition assembly 46 has a key like geometry that matches the geometry of the heat transfer partition guide 34. This feature allows the removable heat transfer partition assembly 46 to be removed or inserted at any time it is needed.

The refrigeration compressor 24 delivers hot, compressed gas to the condenser which removes heat until the gas condenses in to a liquid. This liquid is carried through the heat transfer fluid passage 30 and heat transfer fluid passage manifold 22 to each heat transfer module 10. The flow of heat transfer fluid is controlled by the fluid control valve 48 which receives a signal from the temperature control 50. The heat transfer fluid passes through the heat transfer fluid passages within the heat transfer plate 12 exchanging heat energy with the food holding pan 14 cooling the food products contained within. This heat energy is adsorbed by the heat transfer fluid and it changes state from a liquid to a gas which is directed back to the compressor through the heat transfer fluid passage 30.

The pump delivers heated oil to the heat transfer fluid passage 30 and heat transfer fluid passage manifold 22, which distributes the heated oil to each heat transfer module 10. A fluid control valve 48 receives a signal from the temperature control 50 that opens or closes each fluid control valve 48 to regulate the flow of heated oil and the temperature of the heat transfer plate 12 and heat transfer surface 32 exchanging heat energy with the food holding pan 14 heating the food products contained within. This heat energy is released from the heated oil and the cooled oil is returned to the oil heater to be heated again.

The heat transfer fluid passage 30 is cast in to the heat transfer plate 12 with a heat element 54 fastened to the top surface with multiple mounting bracket 40 components. The heat element 54 can be activated by the temperature control 50 to begin a defrost cycle that will melt any ice that has accumulated on the surface of the heat transfer plate 12. The heat element 54 can also be used to heat the heat transfer plate 12 for holding food hot from 145 to 212 degrees Fahrenheit when the refrigeration system has been disabled by the temperature control 50.

There is one electric heat element 54 on each heat transfer plate 12 that provides heat energy when the temperature control 50 calls for an increase in temperature. Relay R1 disables the refrigeration system when the electric heat element 54 is on to avoid heat and cold energy from being applied at the same time. Each electric heat element 54 is controlled by a relay CR1 and high limit thermostat. The temperature control 50 can be programmed to automatically change the temperature of the heat transfer plate 12 over time, allowing the operator to insert pans of cold food, activate the temperature control 50, and hold the food cold for a predetermined time then automatically change the temperature after a predetermined time.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A food holding appliance for holding food at a desired temperature, comprising:
   a food holding compartment for support of food holding pans, said food holding compartment defining a boundary of a heat transfer space;
   a heat transfer plate having a heat transfer surface for transfer of heat energy to and from stored food products;
   a heat transfer fluid passage thermally coupled to said heat transfer plate for directing a flow of hot or cold heat transfer fluids;
   a thermal insulation space between adjacent food holding compartments;
   a heat transfer module housing for support of said heat transfer plate, said heat transfer module housing defining a boundary of said thermal insulation space, said heat transfer module housing regulating heat transfer from said food holding compartment to an adjacent food holding compartment, said heat transfer module housing encircling said heat transfer module, said heat transfer module housing being rigidly connected to said heat transfer plate;

a rigid support structure for support and location of a plurality of heat transfer modules, said rigid support structure defining a boundary of said food holding compartment;

wherein said heat transfer surface is integrally conformed to said heat transfer plate;

a heat transfer fluid passage manifold fluidly coupled to said heat transfer fluid passage;

a fluid control valve for heat transfer fluid distribution to said heat transfer modules;

a temperature control for temperature control of said heat transfer surface;

at least one heat conductive removable heat transfer partition assembly including removable heat transfer partitions, said removable heat transfer partition assembly hanging from said heat transfer surface, said removable heat transfer partition assembly being slidably coupled to said heat transfer surface;

means for controlling compression of heat transfer fluids fluidly connected to said means for heat transfer fluid distribution to said heat transfer modules;

means for the control of the heat transfer fluid;

means for temperature control of said heat transfer surface;

means for temperature control of said heat transfer module electrically connected to said means for temperature control of said heat transfer surface, and electrically connected to said means for the control of the heat transfer fluid;

means for generating heat energy from electricity thermally connected to said removable heat transfer partitions; and means for control of electric heat elements electrically connected to said means for generating heat energy from electricity, and electrically connected to said means for temperature control of said heat transfer surface.

2. The food holding appliance in accordance with claim 1, further comprising:
a thermal insulation space between adjacent ones of said heat transfer modules; and
a means to support said heat transfer partitions includes:
a heat sink mass;
a heat transfer fluid passage;
a thermal insulation space; and
a housing to contain thermal insulation and said heat transfer plate.

3. The food holding appliance in accordance with claim 1, wherein said heat conductive removable heat transfer partition assembly includes guide slots for supporting said heat transfer partitions and said heat transfer plate.

4. The food holding appliance in accordance with claim 3, wherein said removable heat transfer partition assembly is shaped to follow a contour of said food holding pan.

5. The food holding appliance in accordance with claim 4, wherein said removable heat transfer partition assembly has a key-like geometry that corresponds to a geometry of said guide slots.

6. The food holding appliance in accordance with claim 1, wherein said means for controlling compression of the heat transfer fluids includes a refrigeration compressor.

7. The food holding appliance in accordance with claim 1, further comprising a mounting bracket fastening said heat transfer fluid passage or said heat element to said heat transfer plate.

8. The food holding appliance in accordance with claim 1, wherein said means for temperature control of said heat transfer module includes a refrigeration control system.

9. The food holding appliance in accordance with claim 1, wherein said means for the control of the heat transfer fluid includes a fluid control valve.

10. The food holding appliance in accordance with claim 1, wherein said means for temperature control of said heat transfer surface is a temperature control.

11. The food holding appliance in accordance with claim 1, wherein said means for temperature control of said heat transfer module is an oil heat control system.

12. The food holding appliance in accordance with claim 1, wherein said means for control of electric heat elements is an electric heat control system.

13. A food holding appliance for holding food at a desired temperature, comprising:
a heat sink mass;
a heat transfer fluid passage thermally coupled to said heat sink mass;
a thermal insulation space;
a housing containing said thermal insulation space, thermal insulation and a heat transfer plate;
a plurality of heat transfer partitions;
a heat transfer module including said heat transfer plate, said heat transfer module transferring heat to stored food products through a heat transfer surface connected to said heat transfer plate, said thermal insulation space being between said heat transfer module and at least one other adjacent heat transfer module, and a means to support said heat transfer partitions;
a food holding pan for containment and transport of food products;
a rigid support structure for support and location of said heat transfer modules, said rigid support structure defining a boundary of a heat transfer compartment, said rigid support structure being rigidly fastened to said heat transfer module;
a heat transfer fluid passage manifold for heat transfer fluid distribution to said heat transfer modules;
a refrigeration compressor for controlling compression of said heat transfer fluid, said refrigeration compressor being fluidly connected to said heat transfer fluid passage manifold;
a heat conductive removable heat transfer partition for conduction of heat to side walls of said food holding pan and reduction of convective heat transfer from air flow;
a food holding compartment for support of said food holding pan and said food holding compartment defining a boundary of a heat transfer space, partially framed to said support structure, said food holding pan being removably inserted in said food holding compartment;
wherein said heat transfer fluid passage is fluidly connected to said heat transfer fluid passage manifold and thermally coupled to said heat transfer plate;
wherein said heat transfer surface is integrally conformed to said heat transfer plate;
a heat transfer partition guide for locating and support of removable heat transfer partitions, said heat transfer partition guide being removably connected to said removable heat transfer partition and structurally embedded to said heat transfer plate, said removable heat transfer partitions having a key-like geometry matching a geometry of said heat transfer partition guide;
an insulation space for regulating heat transfer from said food holding compartment to an adjacent food holding compartment, said insulation space suitably encircling said heat transfer module;
a heat transfer module housing for support of said heat transfer plate and defining a boundary of said insulation space, said heat transfer module housing being rigidly connected to said heat transfer plate;
a mounting bracket for locating and fastening said fluid transfer passage or a heat element to said heat transfer plate, said mounting bracket being rigidly connected to said heat transfer plate;
a refrigeration control system for control of said heat transfer module temperature, said refrigeration control system being adaptably coupled to said refrigeration compressor and adaptably coupled to said heat transfer fluid passage manifold;
a fluid control valve for the control of said heat transfer fluid, said fluid control valve being electrically connected to said refrigeration control system and fluidly connected to said heat transfer fluid passage manifold;
a temperature control for temperature control of said heat transfer surface, said temperature control being electrically connected to said refrigeration control system;
an oil heat control system for control of said heat transfer module temperature, said oil heat control system being electrically connected to said temperature control and electrically connected to said fluid control valve;
a heat element for generating heat energy from electricity, said heat element being rigidly connected to said mounting bracket and thermally connected to said heat transfer plate; and
an electric heat control system for control of electric heat elements, said electric heat control system being electrically connected to said heat element and electrically connected to said temperature control.

14. The food holding appliance as recited in claim 13, further comprising:
an air flow passage access panel with air flow passages for covering the compressor compartment and directing cooling air flow, said air flow passage access panel being removably engaged to said support structure.

15. A food holding appliance for holding food at a desired temperature, comprising:
a heat sink mass;
a heat transfer fluid passage thermally coupled to said heat sink mass;
a thermal insulation space;
a housing containing said thermal insulation space, thermal insulation and a heat transfer plate;
a plurality of heat transfer partitions;
a heat transfer module including said heat transfer plate, said heat transfer module transferring heat to stored food products through a surface connected to said heat transfer plate, said thermal insulation space being between said heat transfer module and at least one other adjacent heat transfer module, and a means to support said heat transfer partitions;
a food holding pan for containment and transport of food products;
an air flow passage access panel with air flow passages, said access panel covering a compressor compartment and directing cooling air flow;
a rigid support structure for support and location of said heat transfer modules, said rigid support structure defining a boundary of a heat transfer compartment, said rigid support structure being removably engaged to said access panel and rigidly fastened to said heat transfer module;
a heat transfer fluid passage manifold for heat transfer fluid distribution to said heat transfer modules;
a refrigeration compressor for controlling compression of said heat transfer fluid, said refrigeration compressor being fluidly connected to said heat transfer fluid passage manifold;
a heat conductive removable heat transfer partition for conduction of heat to side walls of said food holding pan and reduction of convective heat transfer from air flow;
a food holding compartment for support of said food holding pan and said food holding compartment defining a boundary of a heat transfer space, partially framed to said support structure, said food holding pan being removably inserted in said food holding compartment;
wherein said heat transfer fluid passage is fluidly connected to said heat transfer fluid passage manifold and thermally coupled to said heat transfer plate;
wherein said heat transfer surface is integrally conformed to said heat transfer plate;
a heat transfer partition guide for locating and support of removable heat transfer partitions, said heat transfer partition guide being removably connected to said removable heat transfer partition and structurally embedded to said heat transfer plate, said removable heat transfer partitions having a key-like geometry matching a geometry of said heat transfer partition guide, said removable heat transfer partitions being shaped to follow a contour of said food holding pan;
an insulation space for regulating heat transfer from said food holding compartment to an adjacent food holding compartment, said insulation space suitably encircling said heat transfer module;
a heat transfer module housing for support of said heat transfer plate and defining a boundary of said insulation space, said heat transfer module housing being rigidly connected to said heat transfer plate;
a mounting bracket for locating and fastening said fluid transfer passage or a heat element to said heat transfer plate, said mounting bracket being rigidly connected to said heat transfer plate;
a refrigeration control system for control of said heat transfer module temperature, said refrigeration control system being adaptably coupled to said refrigeration compressor and adaptably coupled to said heat transfer fluid passage manifold;
a fluid control valve for the control of said heat transfer fluid, said fluid control valve being electrically connected to said refrigeration control system and fluidly connected to said heat transfer fluid passage manifold;
a temperature control for temperature control of said heat transfer surface, said temperature control being electrically connected to said refrigeration control system;
an oil heat control system for control of said heat transfer module temperature, said oil heat control system being electrically connected to said temperature control and electrically connected to said fluid control valve;
a heat element for generating heat energy from electricity, said heat element being rigidly connected to said mounting bracket and thermally connected to said heat transfer plate; and
an electric heat control system for control of electric heat elements, said electric heat control system being electrically connected to said heat element and electrically connected to said temperature control.

* * * * *